United States Patent
Sreeramoju

(10) Patent No.: US 10,645,013 B2
(45) Date of Patent: May 5, 2020

(54) DATA FLOW IDENTIFIERS

(71) Applicant: Nicira, Inc., Palo Alto, CA (US)

(72) Inventor: Akshay Kumar Sreeramoju, Hyderabad (IN)

(73) Assignee: NICIRA, INC, Palo Alto, CA (US)

(*) Notice: Subject to any disclaimer, the term of this patent is extended or adjusted under 35 U.S.C. 154(b) by 221 days.

(21) Appl. No.: 14/991,870

(22) Filed: Jan. 8, 2016

(65) Prior Publication Data
US 2016/0294710 A1  Oct. 6, 2016

Related U.S. Application Data

(60) Provisional application No. 62/142,449, filed on Apr. 2, 2015.

(51) Int. Cl.
*H04L 12/851* (2013.01)
*H04L 12/803* (2013.01)

(52) U.S. Cl.
CPC ...... *H04L 47/2483* (2013.01); *H04L 47/2441* (2013.01); *H04L 47/125* (2013.01)

(58) Field of Classification Search
CPC .. H04L 47/2483; H04L 45/74; H04L 47/2441
See application file for complete search history.

(56) References Cited

U.S. PATENT DOCUMENTS

| | | | | |
|---|---|---|---|---|
| 6,650,640 B1* | 11/2003 | Muller | ............ | H04L 49/602 370/392 |
| 2003/0161312 A1* | 8/2003 | Brown | ............ | H04L 69/16 370/392 |
| 2005/0036619 A1 | 2/2005 | Funnell et al. | | |
| 2005/0226242 A1* | 10/2005 | Parker | ............ | H04L 12/56 370/389 |
| 2006/0168380 A1 | 7/2006 | Benner et al. | | |
| 2009/0010158 A1* | 1/2009 | Filsfils | ............ | H04L 43/026 370/231 |
| 2014/0188891 A1 | 7/2014 | Nath et al. | | |
| 2015/0312155 A1* | 10/2015 | Anand | ............ | H04L 45/7453 370/231 |
| 2015/0326603 A1* | 11/2015 | Deisinger | ............ | H04L 69/166 726/22 |
| 2016/0044118 A1* | 2/2016 | Huang | ............ | H04L 41/5041 709/226 |

FOREIGN PATENT DOCUMENTS

WO   WO 2014/155043   10/2014

* cited by examiner

*Primary Examiner* — Charles C Jiang
*Assistant Examiner* — Voster Preval
(74) *Attorney, Agent, or Firm* — Adeli LLP

(57) ABSTRACT

Some embodiments of the invention provide a method for assigning a data flow-specific identification value to each packet of a data flow. In some embodiments, a particular source endpoint transmits packets belonging to several different data flows to one or more destination endpoints. When sending packets, the source endpoint inserts a unique flow identification value to a particular field of the Internet Protocol (IP) header of each packet of a data flow. The use of these flow identification values enables intermediate network elements and the destination endpoint to efficiently identify to which data flow each packet belongs. In some embodiments, the source endpoint inserts the flow identification value into the 16-bit Internet Protocol version 4 (IPv4) identification field of the IP header of the packets.

22 Claims, 9 Drawing Sheets

DATA FLOW IDENTIFIERS

BACKGROUND

Intermediate devices (e.g., middleboxes) provide network services such as load balancing, firewalling, network address translation, etc. by transforming, filtering, or otherwise manipulating network traffic (e.g., data flows) they receive. Intermediate devices provide these network services by identifying different flows to which data packets belong. For example, each data flow, in TCP/IP networking, is identified by examining the five-tuple of the packet headers (i.e., source IP address, destination IP address, source transport port number, destination transport port number, and transport protocol). The network service provided by an intermediate device through examination of the five-tuple is called a Five-Tuple Service (FTS). To provide an FTS, the intermediate device needs to process the IP header's different fields, such as the Options filed, as well as other fields in the protocol layer (e.g., UDP, TCP, etc.) header of each packet to identify the five-tuple. Each packet of a data flow has an Options field in its IP header, the length of which is variable depending on how many options the data flow may contain.

This method of identifying to which data flow a packet belongs could be undesirable since (i) the IP header Option field's length is variable and (ii) when there is packet fragmentation, the fragmented packets do not contain protocol layers. Traditionally, these challenges have been addressed by providing only Three-Tuple Services (TTS) at a higher granularity on 3-tuple flows (i.e., source IP address, destination IP address, and transport protocol). However, providing 3-tuple services have other shortcomings. For instance, a load balancer that provides a TTS, would not be able to distinguish between different data flows that are originated from the same source endpoint and destined to a same destination endpoint. It is very much possible for such a load balancer, therefore, to direct all the different data flows onto a same link of the network to transmit the packets to the destination endpoint (inefficient traffic management). Moreover, in some networks, the flow source points avoid setting options and Option fields in the packets of the data flows in order to avoid the above-mentioned challenge.

BRIEF SUMMARY

Some embodiments of the invention provide a method that assigns a data flow-specific identifier to each packet of a data flow. Some embodiments assign the flow-specific identifier to the packets at a source endpoint of the packet, while other embodiments assign the identifier to the packets at a midpoint of the flow as the packets are transmitted from a source endpoint to a destination endpoint in a network (e.g., at a gateway as the packets enter a managed network). An endpoint, in some embodiments, is a virtual machine or any other data compute node that is capable of originating data flows. In some embodiments the data compute nodes execute on one or more computing machines (e.g. host machines) of a network (e.g., a data center). In some embodiments, an endpoint is an edge forwarding element (e.g., a hardware switch, a software virtual switch, etc.) to which the virtual machines or other data compute nodes directly couple.

In some embodiments, a particular source endpoint transmits packets belonging to several different data flows to one or more destination endpoints. When sending packets, the source endpoint of some embodiments inserts a unique flow identification value to a particular field of the Internet Protocol (IP) header of each packet of a data flow. The use of these flow identification values enables intermediate network elements and the destination endpoint to efficiently identify to which data flow each packet belongs. In some embodiments, the source endpoint inserts the flow identification value into the 16-bit Internet Protocol version 4 (IPv4) identification field of the IP header of the packets.

The IPv4 identification field of the IP header has traditionally been used to enable reconstruction of a transport layer protocol data unit (e.g., a TCP segment, UDP datagram, etc.) when the protocol data unit is fragmented into several packets. However, because of the high speed and large bandwidths of the links and transmission paths in the networks, many networks do not require packet fragmentation. In such networks, therefore, the source endpoints may set a particular flag in the packets to indicate that the packet should not be fragmented. This particular flag, in some embodiments, is the do not fragment (DNF) bit of the IP header of the packet. Setting the DNF bit in the IP header of a packet prevents all of the forwarding elements (e.g., hardware or software forwarding elements) along the transmission path of the packet from fragmenting the packet.

Some embodiments only use the flow identification value for packets for which the DNF flag is set. When inserting the flow identification value to a packet's IPv4 identification, the source endpoint of some embodiments determines whether a flow identification value has already been assigned to the data flow to which the packet belongs, and uses the previously-assigned flow identification value if possible. When no such flow identification value has been assigned to the data flow (e.g., because the packet is the first packet of the data flow), the source endpoint assigns a new flow identification value and stores this in a list of such values. Some embodiments use the connection five-tuple (source IP address, destination IP address, source transport port number, destination transport port number, and transport protocol) found in the network and transport layer headers of the packet to categorize the flows, with each unique five-tuple assigned a unique flow identification value.

The source endpoints use a specific range of values (e.g., 0-500, 0-1024, etc.) for the flow identification values in some embodiments. When the DNF bit of a packet is not set, the source endpoint uses values outside of the specific range in the IPv4 identification field, used as a packet identifier in case the packet is fragmented by intermediate forwarding elements along its transmission path. For example, some embodiments use values of 0000xx (i.e., the first four bits of the field are 0) for flow identifiers, and use the remaining possible values for standard IPv4 packet identifiers. Using different ranges for the flow identifier and packet identification enables the network elements that process the packet to quickly determine whether the packet can be matched to its data flow via the identifier, without needing to examine the layer 4 (e.g., TCP, UDP) headers of the packet. This also enables the destination endpoint to determine whether to quickly deliver the packet (and to which application the packet should be delivered, without examining the transport layer headers) or to await additional packets for reconstruction of a fragmented packet.

The use of the flow identifier in some embodiments enables an intermediate device of the network, such as a load balancer, to manage network traffic by merely examining the IP header of the packets. The load balancer therefore is not required to be concerned about calculating the length of the IP header of the packet to be able to read the transport layer header (e.g., TCP header) of the packet. More specifically, the load balancer of some embodiments determines to which data flow a packet belongs by reading only the IP header of the packet, and then transmits the packet to the same link to which it has previously transmitted other packets of the same data flow.

As another example, a destination endpoint of some embodiments would be able to transmit the packets of the different data flows to their corresponding destinations by merely reading the IP header of the packets. The destination endpoint is therefore not required to be concerned about the transport layer header (e.g., TCP header) of the packets for transmitting the packets to their destination applications (except for the first packet of each data flow).

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
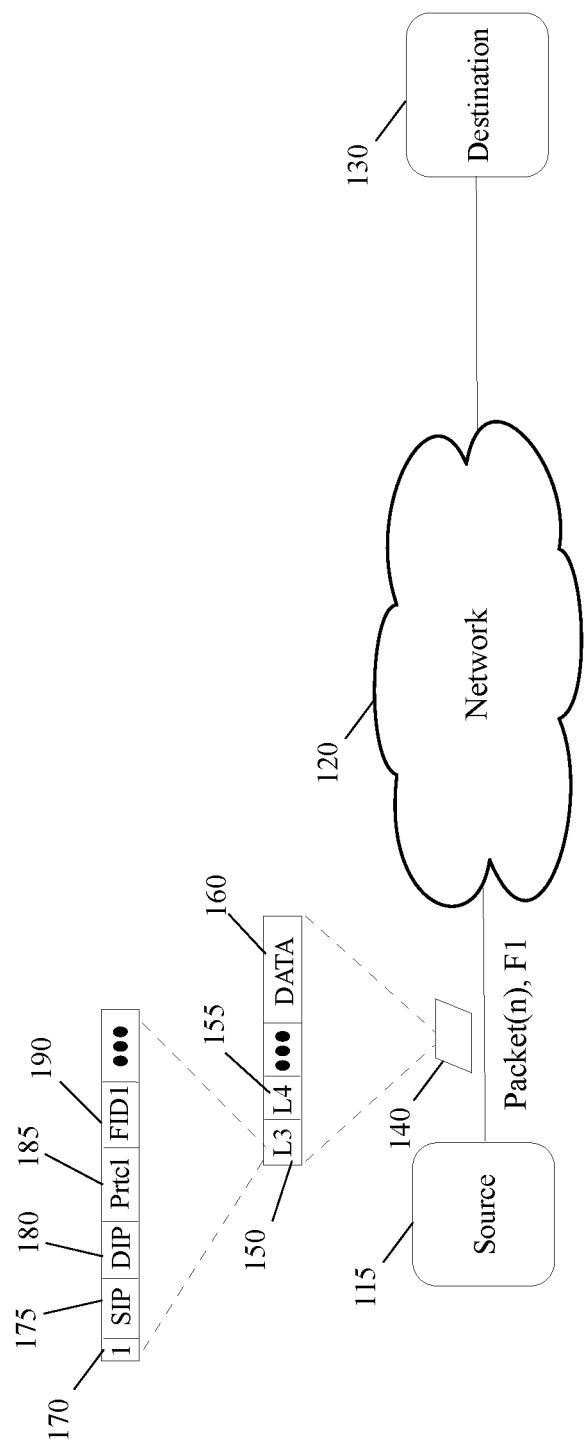
FIG. 1 illustrates assigning a flow identification value to a data flow of a network according to some embodiments.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a method that assigns a data flow-specific identifier to each packet of a data flow. Some embodiments assign the flow-specific identifier to the packets at a source endpoint of the packet, while other embodiments assign the identifier to the packets at a midpoint of the flow as the packets are transmitted from a source endpoint to a destination endpoint in a network (e.g., at a gateway as the packets enter a managed network). An endpoint, in some embodiments, is a virtual machine or any other data compute node that is capable of originating data flows. In some embodiments the data compute nodes execute on one or more computing machines (e.g. host machines) of a network (e.g., a data center). In some embodiments, an endpoint is an edge forwarding element (e.g., a hardware switch, a software virtual switch, etc.) to which the virtual machines or other data compute nodes directly couple.

In some embodiments, a particular source endpoint transmits packets belonging to several different data flows to one or more destination endpoints. When sending packets, the source endpoint of some embodiments inserts a unique flow identification value to a particular field of the Internet Protocol (IP) header of each packet of a data flow. The use of these flow identification values enables intermediate network elements and the destination endpoint to efficiently identify to which data flow each packet belongs. In some embodiments, the source endpoint inserts the flow identification value into the 16-bit Internet Protocol version 4 (IPv4) identification field of the IP header of the packets.

The term "packet" is used above as well as throughout this application to refer to a collection of bits in a particular format sent across a network. It should be understood that the term "packet" may be used herein to refer to various formatted collections of bits that may be sent across a network, such as Ethernet frames, TCP segments, UDP datagrams, IP packets, etc. Moreover, in most of the descriptions above and below, a source endpoint is described to be the generator of the flow identification values for different data flows. However, it should be understood that other elements of the network, such as a forwarding element (e.g., a software or hardware router), could also generate the flow identification values and insert them into the packets of different data flows in a similar fashion. Additionally, in some embodiments, a gateway of a network (e.g., as a datacenter) generates the flow identification values and inserts them into the packets of different data flows.

The IPv4 identification field of the IP header has traditionally been used to enable reconstruction of a transport layer protocol data unit (e.g., a TCP segment, UDP datagram, etc.) when the protocol data unit is fragmented into several packets. However, because of the high speed and large bandwidths of the links and transmission paths in the networks, many networks do not require packet fragmentation. In such networks, therefore, the source endpoints may set a particular flag in the packets to indicate that the packet should not be fragmented. This particular flag, in some embodiments, is the do not fragment (DNF) bit of the IP header of the packet. Setting the DNF bit in the IP header of a packet prevents all of the forwarding elements (e.g., hardware or software forwarding elements) along the transmission path of the packet from fragmenting the packet.

The method of some embodiments examines the DNF bit in the IP header of each received packet first. When the DNF bit is set, the method inserts the flow identification value to the packet's IPv4 identification field. In order to do so, the method of some embodiments determines whether the packet is the first packet of a data flow. Different embodiments make such a determination differently. In some embodiments, the source endpoint identifies a TCP SYN packet (or equivalent handshake-opening packet) as a first packet of a data flow, and other packets as belonging to existing data flows. In some embodiments, the source endpoint stores a list of ongoing data flows, and checks the new packet against this list in order to determine whether the packet is the first packet of the data flow.

In some embodiments, the method retrieves the five-tuple (i.e., source IP address, destination IP address, source transport port number, destination transport port number, and transport protocol) in the network and transport layer headers of the packet. The method then determines whether a flow identification value is assigned for the retrieved five-tuple or not. If the method determines that no flow identification value was assigned for the retrieved five-tuple, the method of some embodiments generates a new flow identification value and inserts the generated value into the IPv4 identification field in the IP header of the packet. On the other hand, if the method determines that the retrieved five-tuple has a previously assigned flow identification value, the method of some such embodiments, inserts the corresponding flow identification value into the IPv4 identification field of the packet.

FIG. 1 illustrates assigning a flow identification value to a data flow of a network according to some embodiments. More specifically, this figure shows the method inserting a flow identification value, which is unique for each packet of a same data flow, into the IP header of the packet. In an IP suite, a data flow is a set of packets that share the same five-tuple (i.e., source IP address, destination IP address, source transport port number, destination transport port number, and transport protocol). FIG. 1 includes a source endpoint 115, a packet 140, a network 120, and a destination endpoint 130.

As illustrated in the figure, the source endpoint 115 has transmitted the packet 140 towards the destination endpoint 130 via network 120. As stated above, in some embodiments, the endpoints are VMs or other data compute nodes (e.g., the TCP/IP stack operating on a VM) while in some other embodiments the endpoints are edge forwarding elements (e.g., software virtual switches) that connect the VMs or other data compute nodes to the network.

As shown in the figure, the packet 140 includes a L3 (IP) header 150, a L4 (TCP, in this case) header 155, several other packet header fields such as L2 addresses, etc. (not shown), and also packet payload data 160. From the perspective of the IP header, the TCP header 155 and any higher-level headers are considered part of the payload (along with the data), while from the perspective of the TCP header 155 the higher-level headers and the data are considered part of the payload.

Each of the headers includes several other fields that carry different information about the packet. For instance, the TCP header 155 identifies source and destination transport-layer port numbers of the packet (not shown). The IP header 150, is also divided into several different fields. Some of these fields, as illustrated, include a Do Not Fragment (DNF) bit 170, a source IP (SIP) field 175, a destination IP (DIP) field 180, a protocol type (Prtcl) field 185, an IPv4 identification field 190, etc. The method first determines that the DNF bit 170 in the IP header 150 is set (i.e., the value stored in the field is 1). The set DNF bit indicates that the intervening forwarding elements between the source and destination will not fragment the packet.

After determining that the DNF bit is set, the source endpoint determines whether a flow identification value has previously been set for this packet or not. In the illustrated example, packet 140 is the $n^{th}$ packet of the data flow F1. As such the source endpoint has previously assigned the flow identification value FID1 to the data flow to which this packet belongs. Consequently, the source endpoint has assigned the same flow identification value to the packet and inserted this value into the IPv4 field 190 of the packet. From this point on in the network, any forwarding element and/or intermediate device on the path of the packet needs to merely look at the IP header of the packet to realize to which data flow the packet belongs in order to forward the packet towards its destination.

Generating flow identification values for different data flows of some embodiments is described above. The following sections describe such flow identification generation and its uses in several more detailed embodiments. Section I describes the flow identification value generation process performed by the source endpoint of some embodiments. Next, Section II sets forth some use cases for assigning flow identification values to different data flows. Finally, Section III describes an electronic system with which some embodiments of the invention are implemented.

I. Generating Flow Identification Values

As stated above, some embodiments only use the flow identification value for packets for which the DNF flag is set. When inserting the flow identification value to a packet's IPv4 identification, the source endpoint of some embodiments determines whether a flow identification value has already been assigned to the data flow to which the packet belongs, and uses the previously-assigned flow identification value if possible. When no such flow identification value has been assigned to the data flow (e.g., because the packet is the first packet of the data flow), the source endpoint assigns a new flow identification value and stores this in a list of such values. Some embodiments use the connection five-tuple (source IP address, destination IP address, source transport port number, destination transport port number, and transport protocol) found in the network and transport layer headers of the packet to categorize the flows, with each unique five-tuple assigned a unique flow identification value.

The source endpoints use a specific range of values (e.g., 0-500, 0-1024, etc.) for the flow identification values in some embodiments. When the DNF bit of a packet is not set, the source endpoint uses values outside of the specific range in the IPv4 identification field, used as a packet identifier in case the packet is fragmented by intermediate forwarding elements along its transmission path. For example, some embodiments use values of 0000xx (i.e., the first four bits of the field are 0) for flow identifiers, and use the remaining possible values for standard IPv4 packet identifiers. Using different ranges for the flow identifier and packet identification enables the network elements that process the packet to quickly determine whether the packet can be matched to its data flow via the identifier, without needing to examine the layer 4 (e.g., TCP, UDP) headers of the packet. This also enables the destination endpoint to determine whether to quickly deliver the packet (and to which application the packet should be delivered, without examining the transport layer headers) or to await additional packets for reconstruction of a fragmented packet.

Figure 2:
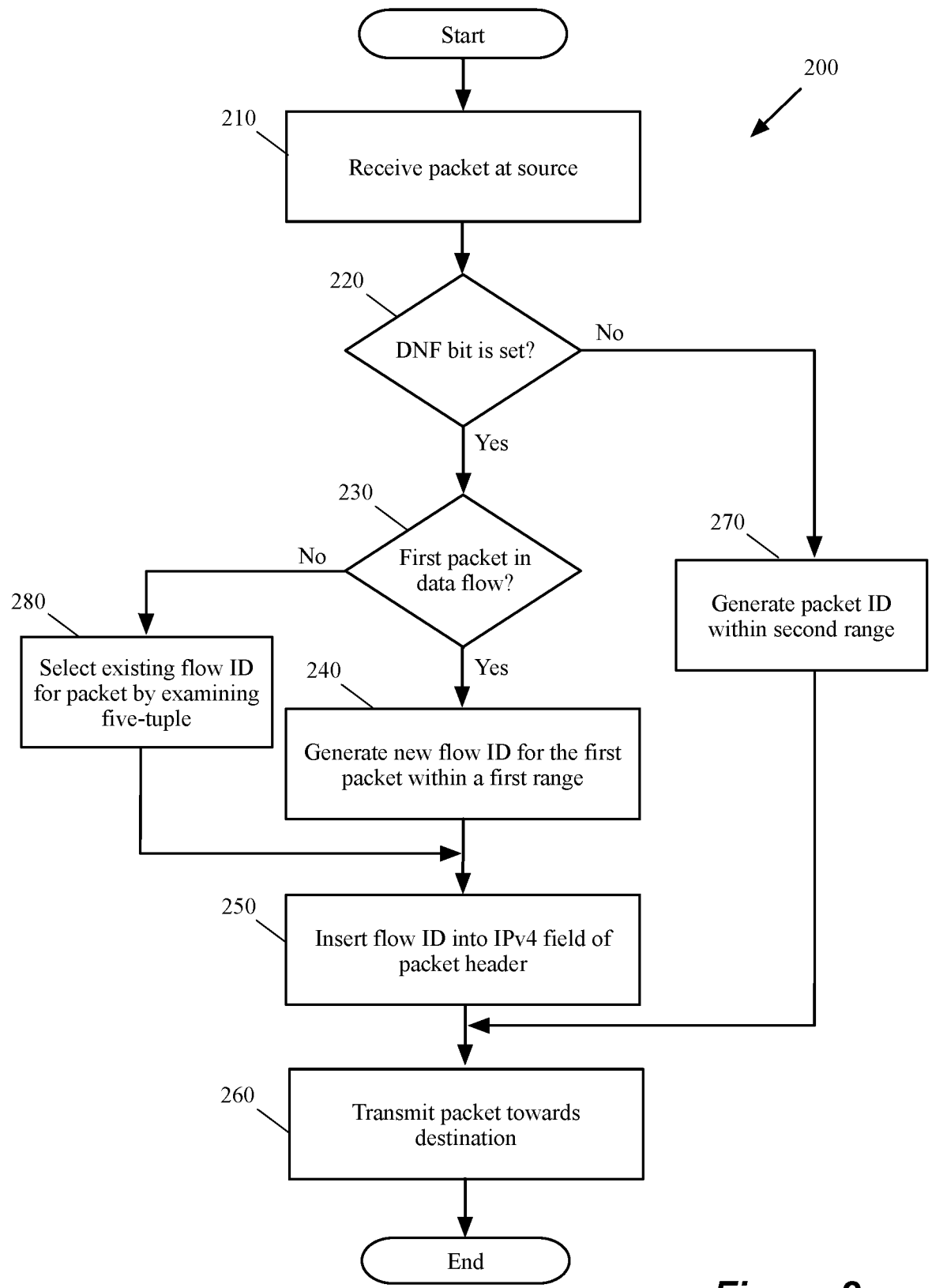
FIG. 2 conceptually illustrates a process of some embodiments for generating flow identification values for different data flows transmitted from a source endpoint.

FIG. 2 conceptually illustrates a process 200 of some embodiments for generating flow identification values for different data flows transmitted from a source endpoint. This figure shows how a source endpoint receives different packets belonging to different data flows (e.g., from different source applications) and inserts separate flow identification values to the packets of each data flow separately. In some embodiments the process 200 is implemented by the source endpoint (e.g., a VM or other data compute node, a virtual switch operating on a host machine with multiple VMs, etc.), or by a forwarding element (e.g., a hardware or software router) along the transmission path of the data flow. Additionally, in some embodiments, the packets are received by an incoming node of a network (e.g., a datacenter), in which all the elements of the network are controlled under a same configuration.

The process 200 begins by receiving (at 210) a packet of a data flow. As an example, the packet might be received by the TCP/IP stack of a VM from an application executing on the VM. In some embodiments, the process 200 is only performed by the endpoint for outgoing packets (i.e., packets for which the endpoint is the source), and not for incoming packets. In some other embodiments the packet is received by an incoming node in a private network (e.g., a datacenter) in which the forwarding elements, endpoints, and other network elements (e.g., middleboxes) are configured by the same control system. The process 200 then determines (at 220) whether the do not fragment (DNF) bit is set in the IP header of the packet (i.e., whether the DNF bit's value is "1"). If the DNF bit is not set, the process 200 transitions to 270.

At 270, the process 200 generates a value for the IPv4 identification field of the IP header of the packet that is outside a certain range assigned for flow identification values. As stated above, the IPv4 identification field carries a monotonic incremental value for each IP packet sent by a particular source in order to reassemble the packets to their original packets at the destination endpoint when the packets are fragmented. The process 200 of some embodiments generates a monotonic incremental value that is not within a certain range of values that the process has assigned for flow identification purposes. For instance, if the process uses values between 1-1000 to assign to packets as different flow identification values, the process generates a monotonic incremental value that is greater than 1000. The process 200 then stores the generated value in the IPv4 identification field of the packet. This way, any network element (forwarding element, intermediate device, destination endpoint, etc.) that later receives the packet, would be able to distinguish packet identification values from flow identification values by simply looking at the value stored in the IPv4 identification field of the packet. In other words, when a network element reads the IP header of the packet, the network element could tell whether the stored value in the IPv4 identification field of the packet is a packet identification value (e.g., when the value is greater than 1000), or a flow identification value (e.g., when the value is less or equal 1000). The process then proceeds to 260 which will be described below.

When the process realizes (at 220) that the DNF bit is set, the process 200 determines (at 230) whether the packet is the first packet of the data flow. In some embodiments, the source endpoint makes such a determination by storing a list of ongoing data flows, and checking the new packet against this list. Some embodiments purge data flows from this list after a particular duration in which no packets are received for the flow (e.g., thirty seconds, one minute, five minutes, etc.). In some embodiments, the source endpoint identifies a TCP SYN packet (or equivalent handshake-opening packet) as a first packet of a data flow, and other packets as belonging to existing data flows. Also, in some embodiment, the TCP FIN/RST packets are used to identify data flow termination (allowing for the removal of a data flow from the set of existing data flows).

When the process determines that the packet is not the first packet of a new data flow, the process selects (at 280) the data flow to which the received packet belongs. In some embodiments, the source endpoint examines the connection 5-tuple in the network and transport layer headers. Any two simultaneous connections (data flows) between two endpoints will have a different five-tuple. For example, if two applications on a first VM are connected to two other applications on a second VM, while the source and destination IP addresses (and possibly the transport protocol) will be the same, the transport port numbers will be different for the two connections, resulting in different five-tuples. The process then finds the corresponding flow identification value for the data flow (e.g., the process looks up the data flow in the list of existing data flows that is stored in a particular data structure). The process then proceeds to 250, which will be described below.

When the process determines that the packet is the first packet of a data flow, the process adds (at 240) the data flow to its list of existing data flows (e.g., the list of ongoing data flows) and generates a new flow identification value for the first packet. In some embodiments the process stores all the previously generated flow identification values in a particular data structure and based on the previously stored values generate a new value for the new data flow. Additionally, as stated above, some embodiments generate a new value that is within a certain range (e.g., between 1-500, 1-1000, etc.) to separate the flow identification values from the packet identification values.

The process then inserts (at 250) the generated and/or selected flow identification value in the IPv4 identification field of the IP header of the packet. In this manner, all the packets that belong to a particular data flow will receive a same flow identification value in their IP headers. The process then transmits (at 260) the packet towards its destination based on the flow identification value stored in the IP header of the packet. The process then ends.

Some embodiments perform variations of the process 200. The specific operations of the process 200 may not be performed in the exact order shown and described. For example, the process of some embodiments sets the DNF bit in the IP header of the packets after the process determines, at the source endpoint, that the DNF bit is not set. In other words, instead of generating (at 270) a monotonic incremental value for the the IPv4 identification field when the DNF bit is not set, the process 200 of some embodiments sets the DNF bit and transitions to 230 to implement the rest of the processing steps. Additionally, the specific operations may not be performed in one continuous series of operations, and different specific operations may be performed in different embodiments.

Figure 3A:
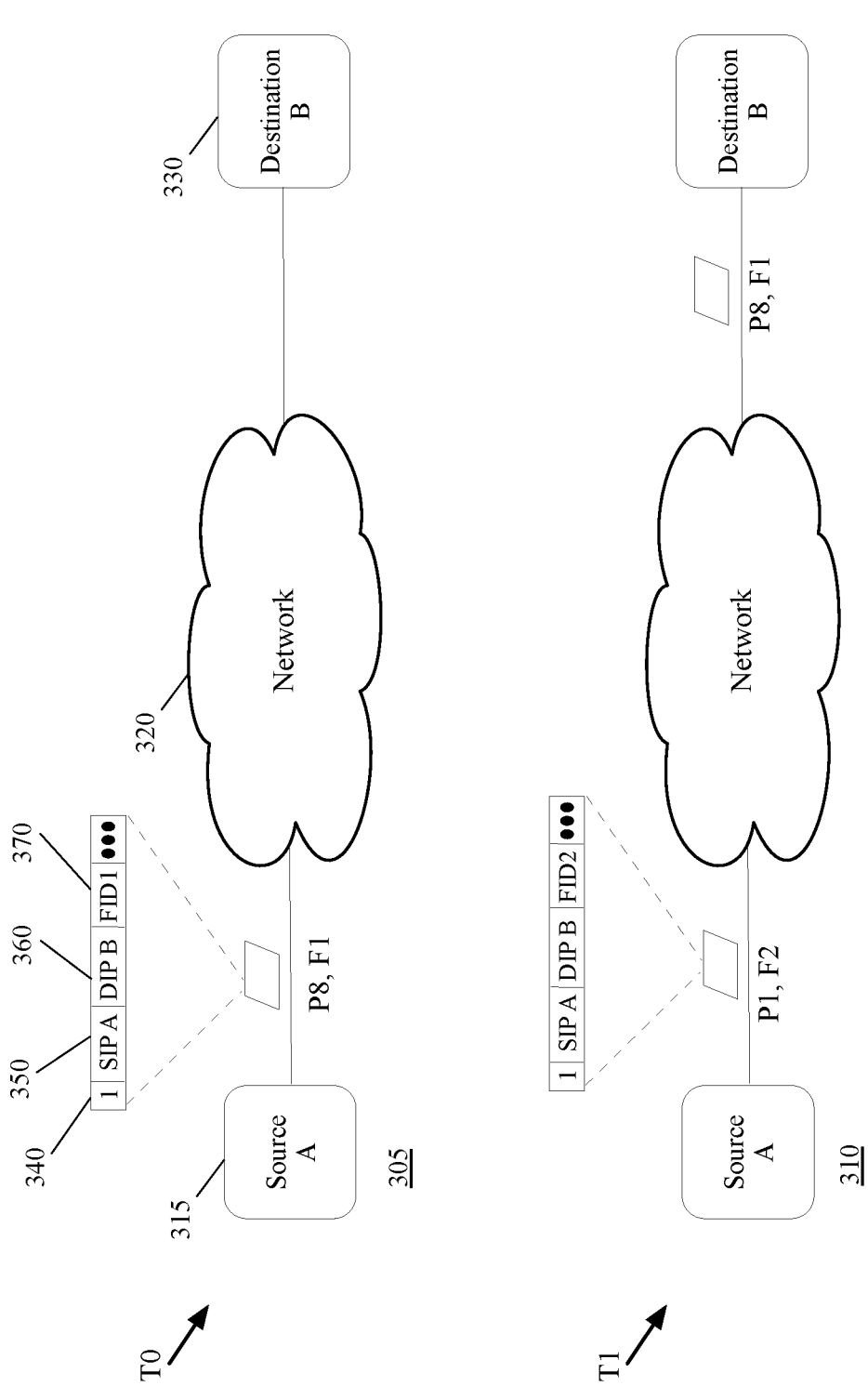
FIGS. 3A-3B illustrate an example of assigning flow identification values to the packets of different data flows as they are transmitted between a source endpoint and a destination endpoint.
Figure 3B:
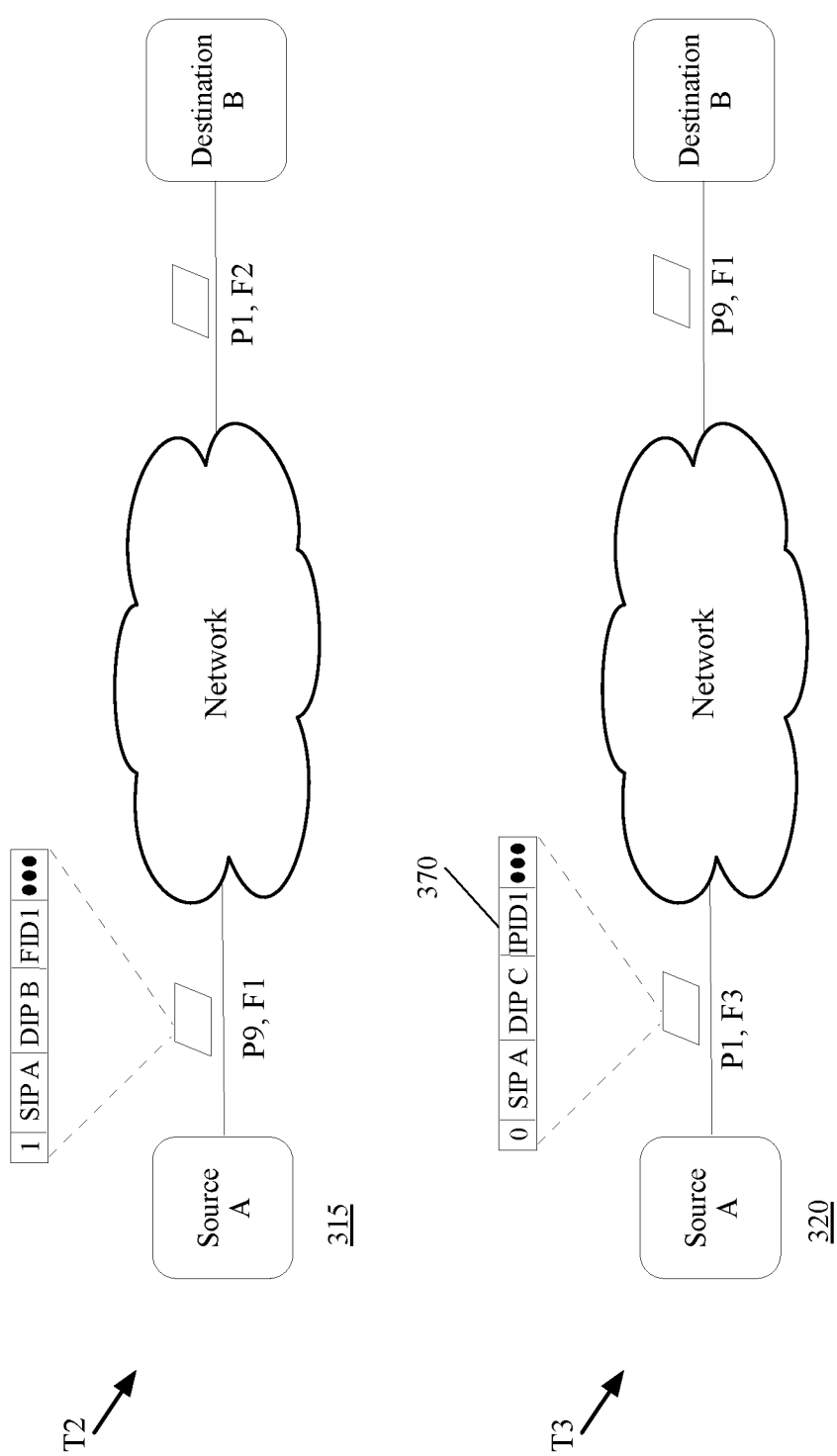

FIGS. 3A-3B illustrate an example of assigning flow identification values to the packets of different data flows as they are transmitted between a source endpoint and a destination endpoint in some embodiments. More specifically, FIGS. 3A-3B illustrate, in four different stages 305-320, which represent four different points of time T1-T4, generating flow identification values for the packets of different data flows. The packets are transmitted from a source endpoint 315 to a destination endpoint 330 through a network 320.

The first stage 305 illustrates that at time T1 the source endpoint 315 (e.g., the edge forwarding element of a host machine) has transmitted the packet P8, which is the $8^{th}$ packet of a first data flow F1 in this example. The IP header of the packet P8, as shown, includes a DNF bit 340, a source IP (SIP) address field 350, a destination IP (DIP) address field 360, and an IPv4 identification field 370. The other fields of the IP header as well other fields of other packet headers (e.g., TCP header) are not shown for simplicity of the description. As shown the source IP address is SIP A (i.e., source endpoint address is A) and its destination IP address is DIP B (i.e., destination endpoint address is B). The first stage 305 also shows that at time T1, the packet P8 has received a flow identification value of FID1, which indicates that this packet belongs to data flow F1.

The source endpoint 315 has determined the flow identification value of the packet by first looking at the DNF bit 340 in the IP header. After determining that the DNF bit is set (i.e., the value stored in the field is 1), the source endpoint determines whether a flow identification value has previously been set for this packet. The source endpoint of some embodiments makes such a determination by reading the five-tuple of the packet and comparing the retrieved five-tuple with a list of existing data flows stored in a particular data structure. The source endpoint then retrieves the flow identification value that corresponds to the data flow (to the five-tuple of the packet) from the particular data structure. Since the packet P8 is the 8th packet of the data flow F1 (not the first packet), the source endpoint does not generate a new flow identification value for the packet. Instead, the source endpoint as stated, retrieves the corresponding value from the list. Accordingly, the source endpoint retrieves the flow identification value FID1 that corresponds to the data flow F1 and stores the value in the IPv4 identification field 370 of the IP header of the packet.

The second stage 310 illustrates that at time T2 the source endpoint 315 has transmitted another packet P1 that is a first packet of a different data flow F2, for which the DNF bit 340 is also set. In some embodiments, the source endpoint determines that the packet P1 is a first packet of a data flow by identifying that the packet is a TCP SYN packet (or equivalent handshake-opening packet). In other embodiments, the source endpoint checks the five-tuple of the packet P1 against the stored list of ongoing data flows in order to determine whether the packet is the first packet of the data flow. After the source endpoint realizes that the packet P1 is the first packet of data flow F2, the source endpoint generates a new flow identification value FID2 for the packet P1 and inserts this identification value into the IPv4 identification field 370 of the packet header. In some embodiments, the source endpoint retrieves the last value in the stored list of flow identification values and assigns the next available number to the new flow identification. As stated above, the source endpoint of some embodiments makes sure that the newly generated value is within a certain range of values that is assigned for flow identification. The source endpoint of some embodiments then stores the newly generated flow identification value (FID2) in the list of existing data flows along with its corresponding five-tuple which represents with which data flow it is associated (i.e., data flow F2).

Additionally, the second stage 310 illustrates that the source IP (SIP) address field 350 of the IP header of the packet P1 of the data flow F2 includes the same source IP address (i.e., SIP A) as packet P8 of the data flow F1 (indicating that the packet P1, F2 is originated at the same source as the packet P8, F1). Similarly, the destination IP (DIP) address field 370 of the packet IP header in this stage includes the same destination IP address as the packet in the previous stage (i.e., DIP B). However, as shown, these two packets of the first and second stages belong to different data flows. The reason for belonging to two different data flows is that although the source endpoint address and destination endpoint address of both packets are the same, these two packets might have been initiated from two different applications that operate on the same machine (e.g., virtual machine). Conversely, and as discussed in more detail below by reference to FIG. 5, the two packets might have different destination applications after they reach the destination endpoint. Therefore, the source endpoint generates a new flow identification value for this new data flow. When the source endpoint is an edge forwarding element, the different data flows could also have different source IP addresses (e.g., the packets could be transmitted from different virtual machines operating on a same host machine). This stage also shows that packet P8 of the first data flow F1 has passed through the network 320 and is being received by the destination endpoint 330.

The third stage 315 of FIG. 3B shows that at time T3 the source endpoint 315 has transmitted another packet P9 from the first data flow F1 for which the DNF bit 340 is set. As shown in stage 315, the source IP (SIP) address field 350 of the IP header of the packet P9, F1 includes the same source IP address SIP A. Also, the destination IP (DIP) address field 360 includes the same destination IP address DIP B which are identical to the SIP and DIP of the IP header of the packets in the previous stages. Though not shown, the transport protocol and port numbers of packet P9, F1 are also the same as the packet P8, F1 of the first stage. Therefore, the source endpoint identifies that the packet P9, F1 belongs to the same data flow as the packet P8, F1, and thus assigns and inserts the same flow identification value FID1 in the IPv4 identification field 370 of the IP header of the packet P9 of the first data flow F1. This stage also shows that packet P1 of the second data flow F2 has passed through the network 320 and is being received by the destination endpoint 330.

The fourth stage 320 illustrates that at time T4 the source endpoint 315 has transmitted yet another packet P1 that is a first packet of the data flow F3. However, as shown in stage 320, although the source IP (SIP) address field 350 of the IP header of the packet P1, F3 includes the same source IP address SIP A, the destination IP (DIP) address field 360 of this packet includes a different destination IP address DIP C which means the packet is headed towards a different destination endpoint. This stage also shows that the DNF bit 340 is not set in the IP header of the packet (i.e., the value stored in the field 340 is 0). As such, the source endpoint realizes that this packet might be fragmented along its path towards the destination endpoint. The source endpoint, therefore, realizes that the IPv4 identification field of the IP header of the packet would not be a reliable field to store a flow identification value for the packet. Consequently, the source endpoint does not use the IPv4 identification field in order to identify the data flow to which the packet belongs. Instead, as stated above, the source endpoint stores a packet identification value IPID1 in the IPv4 identification field of the packet. In some embodiments this packet identification value is within a different range of values than the range of values that is assigned to data flow identification.

In some embodiments, when the flow identification values that the source endpoint generates for different data flows are within a certain range (e.g., 0 to 500, 0 to 1000, 0-5000, etc.), the source endpoint assigns values that are outside this certain range (e.g., 1000-65000) to the packets that can be fragmented. More specifically, when the DNF bit of a packet is not set (i.e., the packet could be fragmented by the forwarding elements), the method of some embodiments generates an incremental value that is outside the certain range and inserts this generated value into the IPv4 identification field of the packet to be used in packet defragmentation. For packets received from another network (e.g., a public network) with the DNF bit not set, some embodiments replace the value stored in the IPv4 identification field of the packet and replace this value with a new value when the value is within the range used for flow identification values (doing so only if the change from the old value to new value is deterministic or if the network entry point stores a mapping of these values for recent packets, so that if the packet is being received in fragments, each fragment will receive the same packet identification value).

Having different ranges of values for flow identification and packet identification enables the network elements to efficiently process and transmit the packets in the network. For instance, it enables the forwarding elements and intermediate devices to determine whether the value is a flow identification value, or a packet identification value by examining only the IP header of the packet (i.e., the IPv4 identification field of the packet). It also enables the destination endpoint to determine to which application the packet should be delivered by simply looking at the IP header instead of reading the five-tuple in the IP and transport layer headers of the packet.

Although in the illustrated example a source endpoint is described to be the generator of the flow and/or packet identification values, one of ordinary skill in the art realizes that other elements of the network, such as a forwarding element (e.g., a software or hardware router), could also generate the flow and/or packet identification values and insert them into the packets of different data flows in a similar fashion. Moreover, one of ordinary skill in the art realizes that not in all embodiments the packet is received and the identification values are generated by the source endpoint. For example, in some embodiments, the packets of different data flows are received by an incoming node (e.g., a point of entry) in a private network (e.g., a datacenter) in which the forwarding elements, endpoints, and other network elements (e.g., middleboxes, etc.) are configured by the same control system. Lastly, although the illustrated example shows that the packet for which the DNF bit is not set, is a packet that belongs to a different data flow F3, it should be understood that the packets with unchecked flags (i.e., DNF bit is not set in the packet) may belong to any data flow including the illustrated data flows F1 and F2 (although rarely).

It should be understood that the sequences of the packets and the data flows shown in FIG. 3 at four different points of time T1-T4 serve only as examples and to simplify the description. For example, a source endpoint may transmit numerous packets of a particular data flow before transmitting a packet of any other data flow. Conversely, a source endpoint may forward multiple packets belonging to multiple different data flows before transmitting a second packet in one of the transmitted data flows.

II. Use Cases for Flow Identification Values

The use of the flow identifier in some embodiments enables an intermediate device of the network, such as a load balancer, to manage network traffic by merely examining the IP header of the packets. The load balancer therefore is not required to be concerned about calculating the length of the IP header of the packet to be able to read the transport layer header (e.g., TCP header) of the packet. More specifically, the load balancer of some embodiments determines to which data flow a packet belongs by reading only the IP header of the packet, and then transmits the packet to the same link to which it has previously transmitted other packets of the same data flow.

Reading only the IP headers of the packets to determine to which data flows the packets belong results in a highly efficient network traffic management. For instance, because of variable length of the IP header (because of the variable length of the Option field in the IP header), the load balancer has to calculate the length of the IP header for each packet to be able to read the TCP header from the right location in the packet and to determine to which data flow the packet belongs. Instead, when each packet of a data flow carries a flow identification value in the packet's IP header, the load balancer determines to which data flow the packets belong by reading only the IP headers of the packets. In this manner, the load balancer, by looking at the IP header, may transmit a packet that belongs to a particular data flow to a same link that other packets of the particular data flow have been previously transmitted. This way, although the load balancer does not read the TCP headers of the packets, it is able to transmit the different data flows that are initiated at the same source endpoint to different links that carry the data flows to the same destination endpoint.

Figure 4:
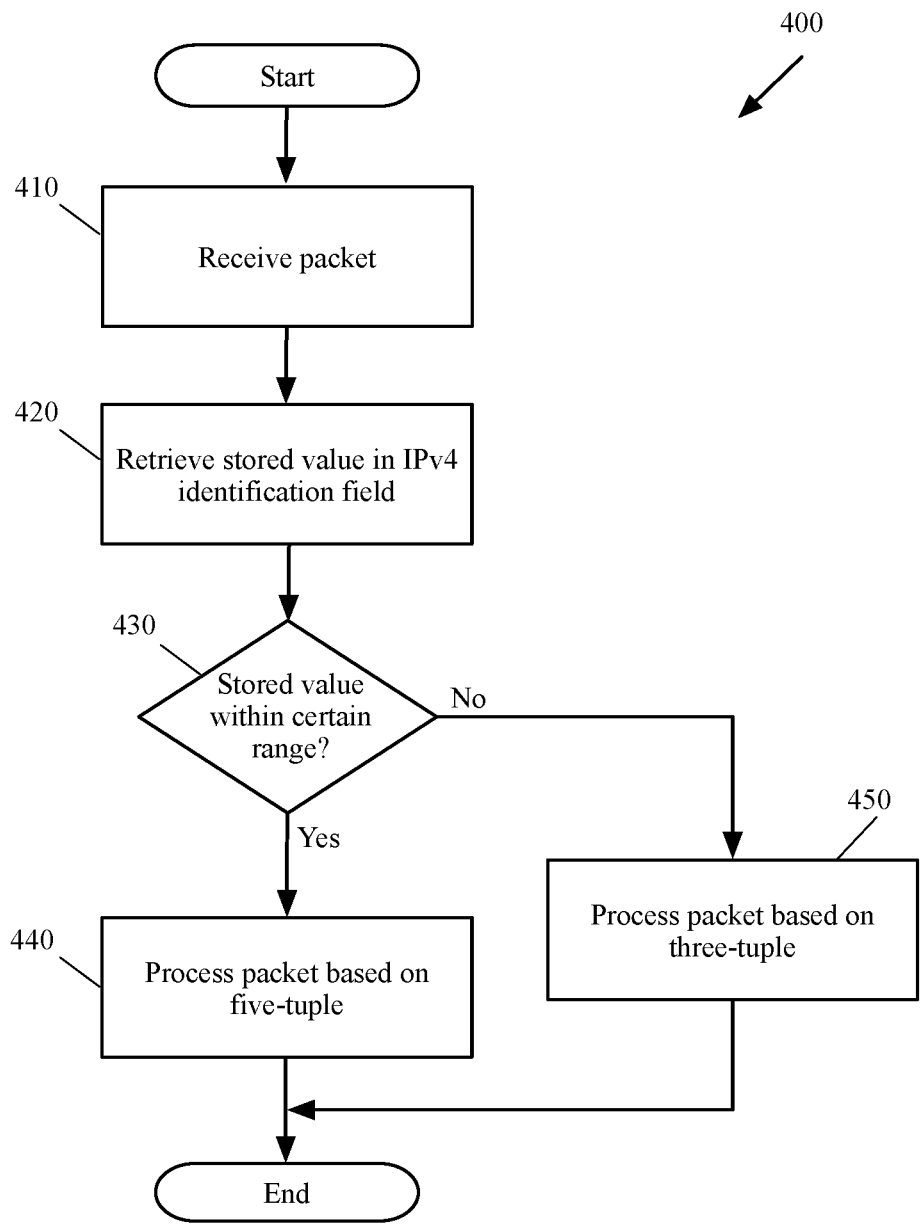
FIG. 4 conceptually illustrates a process for managing the network traffic by transmitting packets of different data flows to different paths of the network.

FIG. 4 conceptually illustrates a process 400 of some embodiments that manages the network traffic by transmitting packets of different data flows to different paths of the network (each of which carries the packets towards the same destination). In some embodiments, the process 400 is implemented by a load balancer of the network. FIG. 4 will be described by reference to FIG. 5 which illustrates an example of how the process 400 identifies to which data flow each packet belongs in order to transmit the packet on the right path.

The process 400 begins by receiving (at 410) a packet of a data flow. As stated above, the received packets are originally transmitted by a source endpoint that has inserted different flow identification values into the packets' IP headers of different data flows. The process then retrieves (at 420) the value stored in the IPv4 identification field of the packet. The process retrieves this value by reading the IP header of the packet. The process then determines (at 430) whether the stored value is within a certain range that was previously defined as the range of flow identification values. If the stored value is within the certain range (e.g., between 1-1000) the process processes (at 440) the packet based on five-tuple (i.e., the process provides a five-tuple service). That is, the process 400 only reads the IP header of the packet and in return, it receives all the information it needs to apply a five-tuple service (as if the process has read both IP and TCP headers of the packet to receive the five-tuple information).

For processing the packet based on the five-tuple of the packet (although not shown in the figure), in some embodiments the process determines whether the received packet belongs to a data flow that is in an ongoing data flow list. That is, the process determines whether any previous packets have been received with the same flow identification value. In some embodiments, the process stores a list of ongoing data flows for which it has received packets within a particular time duration. When the packet belongs to an ongoing data flow, the process transmits the packet on a link on which other packets of the same data flow (i.e., other packets that have the same flow identification value) have been transmitted before. On the other hand, if the packet belongs to a new data flow (i.e., the process does not find a match in the ongoing data flow list), the process transmits the packet onto a same or different link based on the available bandwidth of the links.

In other embodiments, the process provides five-tuple service by incorporating the flow identification value into a deterministic computation (e.g., a hash calculation) used to determine the link onto which to transmit the packet. So long as this computation is deterministic, no lookups into a flow list (which cost CPU resources and introduce latency) are required and all the packets for any particular flow will be transmitted onto the same link. By incorporating the flow identification value into the computation, the load balancer of some embodiments provides five-tuple service without reading the transport header of the packet.

Figure 5:
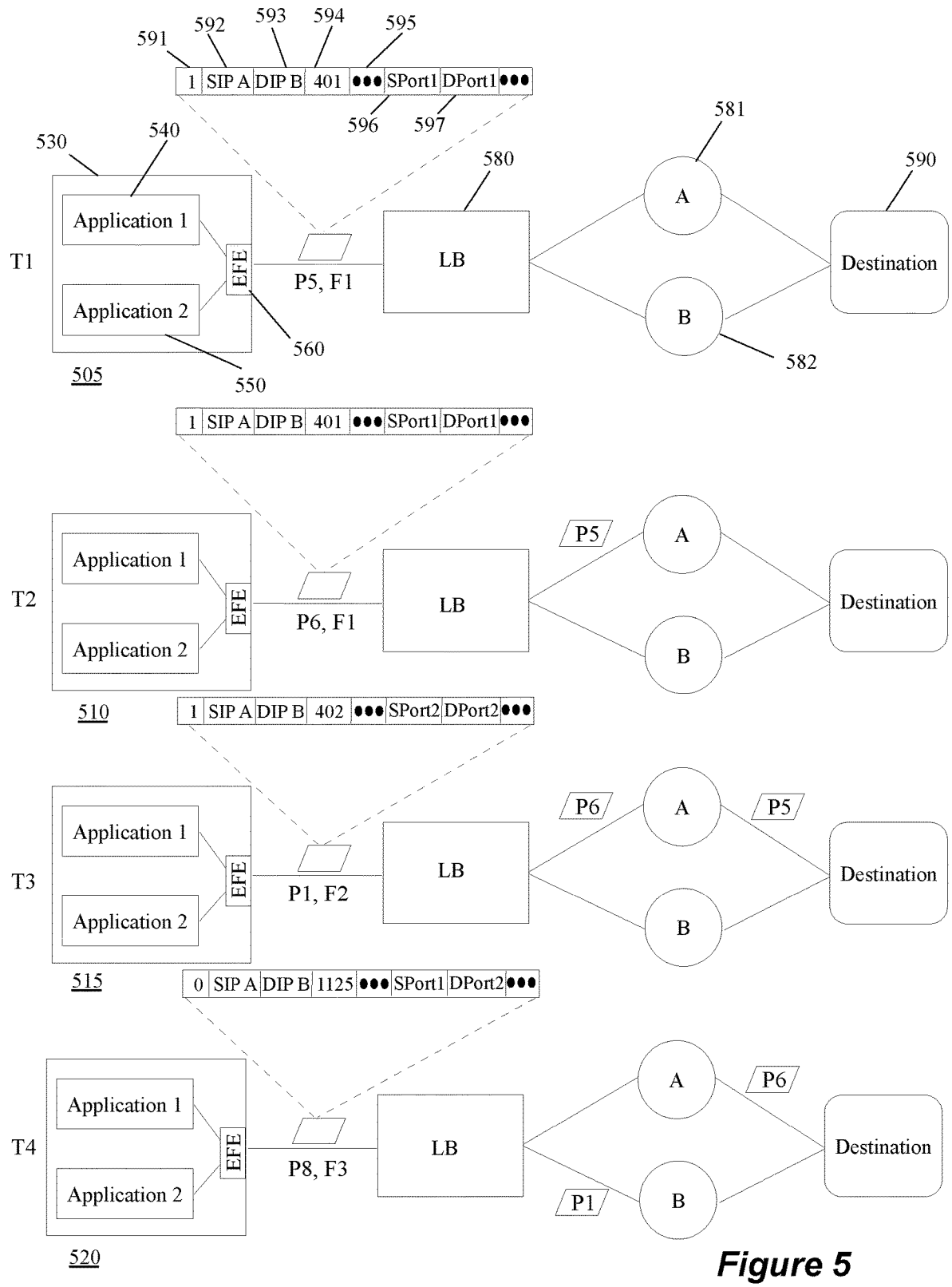
FIG. 5 illustrates an example of how the process of FIG. 4 identifies to which data flow each packet belongs in order to transmit the packet on the right path.

FIG. 5 illustrates, in four stages 505-520, how a load balancer of some embodiments directs the packets of different data flows that it receives, onto different links of the network using only the IPv4 identification fields of the packets. The first stage 505 illustrates a source computing machine 530, a load balancer 580, a destination endpoint 590, and two forwarding elements 581 and 582 that are on two different links between the load balancer 580 and the destination 590. The computing machine 530 (e.g., a host machine in a network, a virtual machine operating on a host of a network, etc.) includes two different applications 540 and 550, and an edge forwarding element 560 (e.g., a software virtual switch).

In the illustrated example, the two applications execute on a single virtual machine that runs on the host machine. In some other embodiments, the two applications could operate on two different virtual machines in the same host. In this example, the edge forwarding element 560 acts as the source endpoint that generates flow identification values for all the packets of different data flows from the two applications 540 and 550 (as well as any other applications that runs on the same or different virtual machines of the same host). In some embodiments, the network stack of the VM on which the applications 540 and 550 operate would generate the flow identification values while is some other embodiments a forwarding element (e.g., a software or hardware router) on the path of the packets generates the flow identification values and inserts the generated values into the IPv4 identification fields of the IP header of the packets.

The first stage 505 shows that at time T1 the load balancer 580 receives the packet P5 of the data flow F1 from the source endpoint 560. The packet P5 is originated from the Application 1 executing on the computing machine 530. The packet P5 includes a DNF bit 591, a source IP address 592, a destination IP address 593, an IPv4 identification field 593, other IP header fields 594, and TCP source and destination port fields 596 (SPort1) and 597 (DPort1) as well as other fields that are not shown for simplicity of the description. As shown, the DNF bit 591 of the packet is set which means the packet should not be fragmented.

The set flag also shows that the packet carries a flow identification value. The source IP address is SIP A, which shows that the packet is sent from the source endpoint 560. The destination IP address of the packet P5 is DIP B, which indicates that the packet P5 is destined for the destination endpoint 590. The source port address 596 in the TCP header of the packet indicates the port of the application that has generated the packet (i.e., Application 1 in this example) while the destination port address 597 identifies the port address of the application that will eventually receive the packet. The other fields 595 include the other IP header fields of the packet such as the IP Option field, which can have variable lengths. The load balancer 580, however, is not required to look at the other fields 595 in order to (i) calculate the starting place of the TCP header of the packet and (ii) read the five-tuple of the packet to determine to which link it should transmit the packet. As a matter of fact and as will be described in detail below, the load balancer 580 does not even have to read the TCP header of the packets for such purpose.

As illustrated in stage 505, the IPv4 identification field of the packet P5 carries a value of 401. As stated above, when the value of the IPv4 identification field is within a specified range defined in the configuration of the network, the network elements could determine that the value is a representative of a data flow. In this case, the range is defined to be within 1 and 1000. Therefore, when the load balancer 580 receives the packet, because the value stored in the IPv4 identification field is within the specified range, the load balancer knows that the packet belongs to a particular data flow that is represented by this value and therefore it can handle the packet accordingly.

The second stage 510 shows that at time T2 the load balancer 580 has transmitted the packet P5 towards the forwarding element 581. The load balancer has done so because the previous packets of the data flow with flow identification values 401 have been transmitted onto the same link (although not shown in the figure) towards the forwarding element 581. In this manner, the load balancer makes sure that all the packets that belong to the same data flow would be forwarded on the same link of the network by only reading the IP header of the packets. The second stage 510 also shows that the load balancer receives a new packet P6 from the source endpoint 560. As indicated by the data in the TCP header of this packet, the source and destination ports of the packet (SPort1 and DPort1) are the same as the source and destination ports of packet P5 in the first stage. As such, this packet belongs to the same data flow F1 to which the packet P5 belongs. Additionally, the source and destination machines are the same in both data flows, and thus the two data flows have the same source and destination IP addresses (i.e., SIP A and DIP B). However, the load balancer is not required to know about all of these information because it simply reads the IPv4 identification field of the packet P6 and realizes that this packet is from the same data flow as the packet P5 was. More specifically, the load balancer 580 only looks at the value 401 stored in the IPv4 identification field of the packet and compares it with the list of ongoing data flows that is stored in a particular data structure of the load balancer. Because this value matches the same data flow that was determined for packet P5, the load balancer will transmit the packet onto the same path as it did for the packet P5.

As described in FIG. 4, when the process 400 determines that the packet belongs to an ongoing data flow, the process transmits the packet to a link on which other packets of the same data flow (i.e., other packets that have the same flow identification values) have been previously transmitted. On the other hand, when the process 400 determines that the packet belongs to a new data flow (i.e., the process does not find a match in the ongoing data flow list), the process transmits the packet onto a same or different link of the network based on the available bandwidth of the links.

The third stage 515 of FIG. 5 illustrates that at time T3 the load balancer 580 receives a new packet P1 of a second different data flow F2 from the source endpoint 560. However, as indicated by the data in the TCP header of the packet, the source and destination ports of this packet (SPort2 and DPort2) are different than the source and destination ports of the packets P5 and P6 of the first and second stages respectively. As such, the packet P1 belongs to a second data flow F2 initiated by a different application running on the same virtual machine (Application 2). The source and destination machines are the same in both data flows, and thus the two data flows have the same source and destination IP addresses (i.e., SIP A and DIP B). The load balancer, again, is not required to know about this information though. The load balancer only looks at the IPv4 identification field of the packet and realizes that not only the stored value is indicative of a flow identification value (because the value is within the specified range), but also it indicates that the packet belongs to a different data flow than the previous data flow (the value is 402). This stage also shows that the packet P6 of the first data flow F1 has been transmitted out of the load balancer onto the same link that the previous packet of the data flow (P5) was transmitted.

Returning to FIG. 4, when the process 400 determines (at 430) that the value of the IPv4 identification field of the received packet is not within the specified range (e.g., the value is between 1001-65000) the process processes (at 450) the packet based on the three-tuple of the packet (i.e., source IP, destination IP, and protocol). That is, because the stored value indicates that the packet is a packet that can be fragmented, the process 400 only reads the IP header of the packet and ignores to which data flow the packet belongs (because the data stored in the TCP header of the packet is not reliable). The process of some embodiments, in this type of situation, transmits the packet to a link to which the process has transmitted the last packet with the same three-tuple information.

The fourth stage 520 of FIG. 5 illustrates that at time T4 the load balancer 580 receives a new packet P8 that belongs to yet another data flow F3 from the source endpoint 560. This stage shows that the packet P8 is a packet that can be fragmented since the DNF bit 591 in the IP header of the packet is not set (the stored value is 0). Also, as indicated by the data in the TCP header of the packet, the source and destination ports of this packet (SPort1 and DPort2) are different than the source and destination ports of the packets P5 and P6 of the data flow F1 and the packet P1 of the data flow F2. As such, this packet belongs to a third data flow F3 initiated by the Application 1, which is destined to be transmitted to a different application. The source and destination machines of this data flow, however, are still the same as the source and destination machines of data flows F1 and F2. Therefore all of the three data flows have the same source and destination IP addresses (i.e., SIP A and DIP B). The load balancer at this stage too, is not required to know about this information. The load balancer reads the value stored in the IPv4 identification field and realizes that the stored value is not representative of a flow identification (because the value is outside the specified range). The load balancer, therefore, will transmit (not shown) the packet by applying three-tuple services and as described above.

The fourth stage 520 also shows that the load balancer has determined that (i) the packet P1 of the data flow F2 is from a different data flow and (ii) the network path to the forwarding element 582 has more available bandwidth than the other path. Therefore, the load balancer has transmitted the packet P1 onto the path with more available bandwidth instead of sending the packet to the same path that it has sent the other two packets at stages 505 and 510 respectively.

Although the illustrated example describes a load balancer, one of ordinary skill in the art would realize that any other intermediate device (e.g., a firewall, a network address translator, an intrusion detection system, etc.) of the network that processes the packets based on their data flows, could be equally efficient using the generated flow identification values. That is, any middlebox of a network that is required to know about the five-tuple information of a packet before processing the packet would be able to handle the packets of different data flows as efficiently as described above for the illustrated load balancer. For instance, a firewall that allows certain data flows to pass through the network while prevent other data flows from passing through the network, simply makes such decisions by reading only the IP header of each packet of the different data flows.

Some embodiments perform variations of the process 400. The specific operations of the process 400 may not be performed in the exact order shown and described. For example, the process of some embodiments, before retrieving the IPv4 identification field of the packet's IP header, reads the DNF bit only and does not specify a certain range for flow identification values. Additionally, the process of some such embodiments, after checking the DNF bit, reads the value stored in the IPv4 identification field of the packet's IP header in order to identify the flow identification value of the packet. In other words, in these embodiments, the process looks at the DNF bit and the IPv4 identification field in order to identify to which data flow the packet belongs. Additionally, the specific operations may not be performed in one continuous series of operations, and different specific operations may be performed in different embodiments.

As another example, a destination endpoint of some embodiments would be able to transmit the packets of the different data flows to their corresponding destination applications by merely reading the IP header of the packets. The destination endpoint is therefore not required to be concerned about the transport layer header (e.g., TCP header) of the packets for transmitting the packets to their destination applications (except for the first packet of each data flow which will be described in more detail below).

The destination endpoint of some embodiments determines whether the packet that it receives is the first packet of the data flow or not. If the packet is the first packet of the data flow, the destination endpoint reads the five-tuple of the packet to realize with which destination application the flow identification of the packet is associated. After realizing this association, for every subsequent packet of the data flow, the destination endpoint would be able to transmit the packets to the right destination by merely reading the IP header of the packets.

Figure 6:
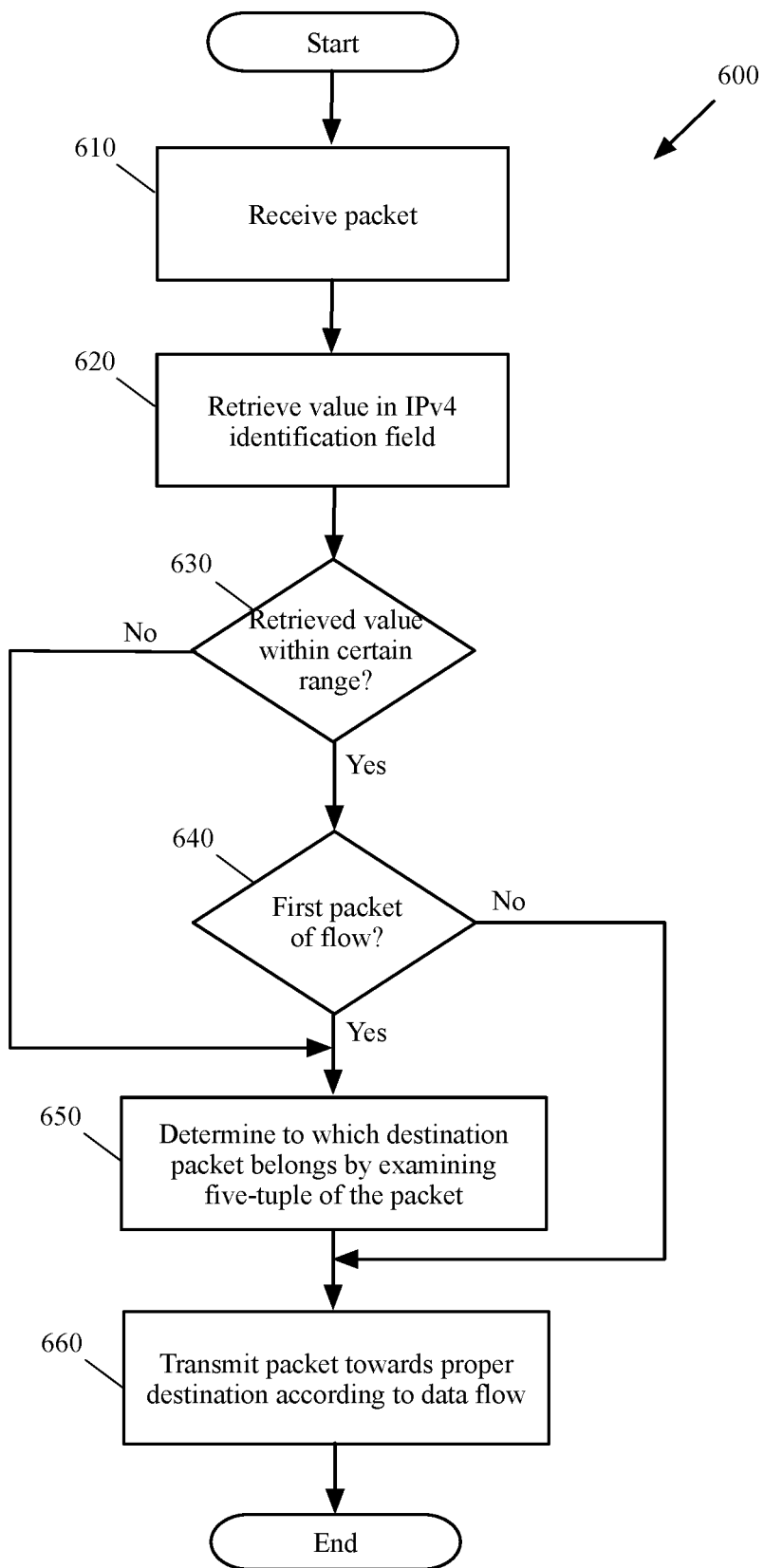
FIG. 6 conceptually illustrates a process of some embodiments that transmits packets of different data flows to their corresponding destination applications.

FIG. 6 conceptually illustrates a process 600 of some embodiments that transmits packets of different data flows to their corresponding destination applications. In some embodiments, the process 600 is implemented by a destination endpoint of the network. FIG. 6 will be described by reference to FIG. 7 which illustrates an example of how the process 600 identifies to which data flow each packet belongs by merely reading the IP header of the packets.

The process 600 begins by receiving (at 610) a packet of a data flow. As stated above, the received packets are originally transmitted by a source endpoint that has inserted different flow identification values into the packets' IP headers of different data flows. The process then retrieves (at 620) the value stored in the IPv4 identification field of the packet. The process retrieves this value by reading the IP header of the packet only. The process then determines (at 630) whether the stored value is within a certain range that was previously defined as the range of flow identification values. When the process determines that the value is not within the specified range, the process proceeds to 650, which will be described below. On the other hand, if the process determines that the stored value is within the specified range (e.g., between 1-1000), the process determines (at 640) whether the packet is the first packet of the data flow. When the process determines that the packet is the first packet of the data flow or the packet's DNF bit is set, the process reads the five-tuple of the packet in order to determine to which destination application the packet should be transmitted. The process then saves (not shown) the flow identification value and its associated destination application in a particular data structure of the endpoint for subsequent packets of the data flow.

Figure 7:
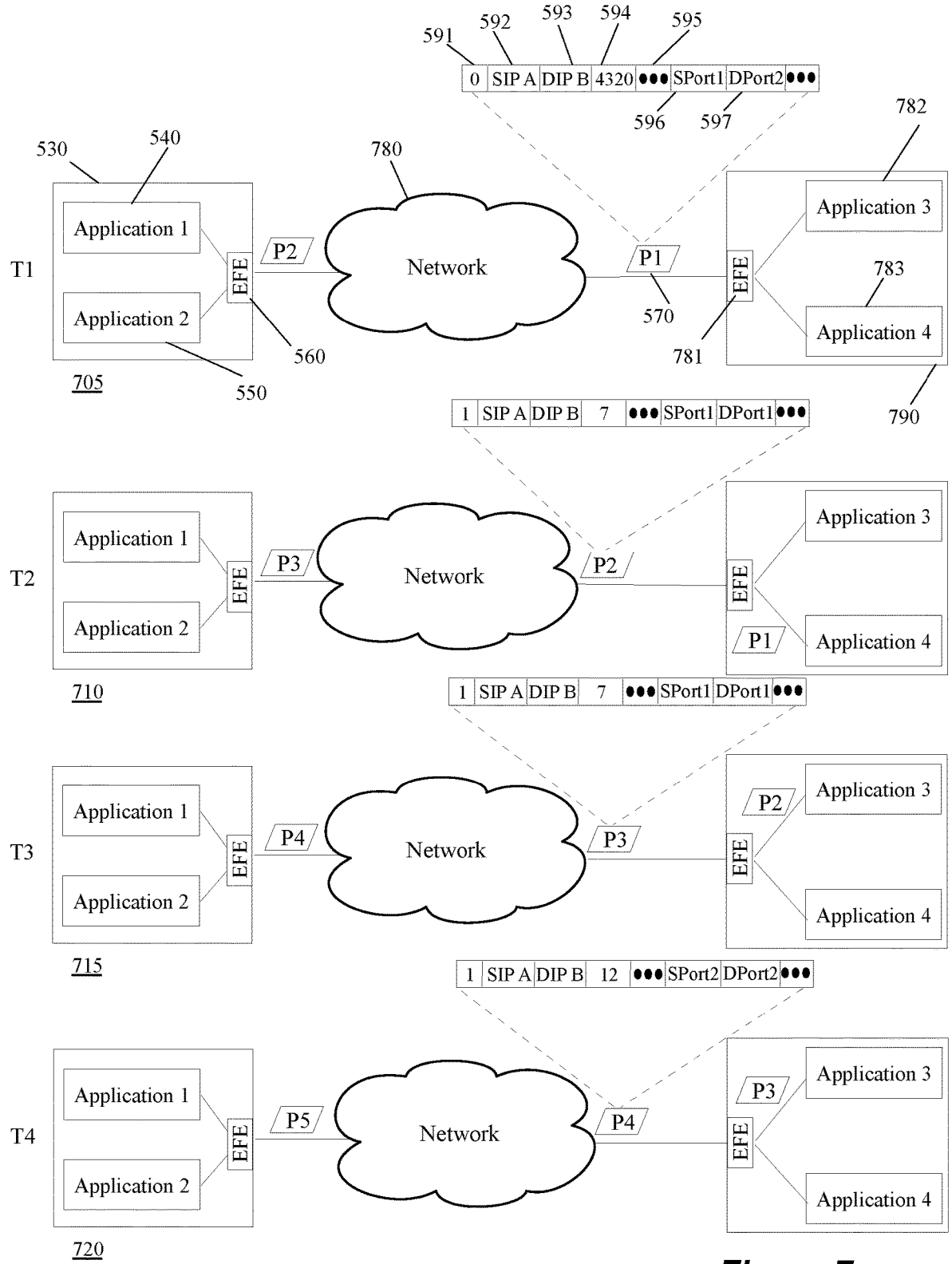
FIG. 7 illustrates how a destination endpoint directs the packets of different data flows to different destination applications using the IPv4 identification fields of the packets.

FIG. 7 illustrates, in four stages 705-720, how a destination endpoint of some embodiments directs the packets of different data flows that it receives to different destination applications using the IPv4 identification fields of the packets. The first stage 705 illustrates a source computing machine 530, a network 780, and a destination computing machine 790. The source and destination computing machines 530 and 790 in some embodiments are virtual machines that execute different applications. For instance, the source virtual machine 530 executes applications 540 and 550 while the destination virtual machine executes the applications 782 and 783.

The source forwarding element 560 of some such embodiments is a virtual port of the source virtual machine that generates the flow identification values for the packets of different data flows. Similarly, the destination forwarding element 781 of these embodiments is a virtual port of the destination virtual machine that receives the different data flows and forwards the packets to their destination applications. In some other embodiments, the source and destination computing machines 530 and 790 are host machines on which the source and destination machines operate respectively. In some such embodiments the sour forwarding element 560 is an edge forwarding element of the source host machine that generates the flow identification values for the packets of different data flows, while the destination forwarding element 781 is an edge forwarding element of the destination host machine that receives the different data flows and forwards the packets to their destination applications running on their corresponding destination virtual machines.

The first stage 705 shows that at time T1 the destination endpoint 781 receives the packet P1 of a first data flow from the source endpoint 560. The packet P1 is originated from the Application 1 executing on the computing machine 530. The packet P1 includes a DNF bit 591, a source IP address 592, a destination IP address 593, an IPv4 identification field 593, other IP header fields 594, and TCP source and destination port fields 596 (SPort1) and 597 (DPort1) as well as other fields that are not shown for simplicity of the description.

As shown, the DNF bit 591 of the packet is not set which means the packet might have been fragmented on its path towards the destination. The source IP address is SIP A which shows that the packet is sent from the source endpoint 560. The destination IP address of the packet P1 is DIP B which indicates that the packet P1's destination endpoint is 781. The source port address 596 in the TCP header of the packet indicates the port of the application that has generated the packet (i.e., Application 1 in this example) while the destination port address 597 identifies the port address of the application that will eventually receives the packet (i.e., Application 3 in this example). The other fields 595 include the other IP header fields of the packet such as the IP Option field, which can have variable lengths.

The destination endpoint 781, as described for the process 600 of FIG. 6, first determines whether the value stored in the IPv4 identification field of the packet is with the specified range or outside of it. In this example, the stored value is 4320 (not between 1-1000), which shows that the packet could be a fragmented packet. As such the destination endpoint reads the five-tuple of the packet P1 in order to determine to which destination application the packet should be transmitted. As shown, the destination port of the packet is DPort2 which indicates that the packet is destined for application 783 (Application 4) running on computing machine 790. Therefore, the destination endpoint will transmit the packet to Application 3. This stage also shows that the source endpoint 560 has transmitted packet P2 towards the destination endpoint 781.

The second stage 710 shows that at time T2 the destination endpoint 781 has received the packet P1 and transmitted this packet towards the application 783 which is the destination application for this packet based on the TCP header information of the packet. The second stage 710 also shows that the destination endpoint 781 receives a new packet P2 from the source endpoint 560. This packet is the first packet of the second data flow and as such the destination endpoint has to read the five-tuple information of the packet in order to send the packet to a proper destination application. As indicated by the data in the TCP header of this packet, the source and destination ports of the packet are SPort1 and DPort1, which indicate that the packet is originated from application 540 running on the computing machine 530 and is destined for application 782 (Application 3) running on the computing machine 790. Additionally, the source and destination machines are the same source and destination machine as for the first data flow, and thus the two data flows have the same source and destination IP addresses (i.e., SIP A and DIP B). The destination endpoint should then transmit the packet to application 782 based on the retrieved five-tuple information. This stage also shows that at time T2, the source endpoint has transmitted the packet P3 towards the destination endpoint.

Returning to FIG. 6, when the process 600 determines that (i) the value stored in the IPv4 identification field is within the certain range, and (ii) the packet is not the first packet of its data flow, the process will not read the five-tuple of the packet and transmits (at 660) the packet based on the value retrieved at 620. For transmitting the packet by reading only the stored value in the IPv4 identification field of the packet, the process of some embodiments searches the value against the list of ongoing data flows. As stated above, in some embodiments, the endpoint stores a list of ongoing data flows for which it has received packets before. When the packet belongs to an ongoing data flow, the endpoint retrieves the matched flow identification from the list and finds out what the associated destination application for this flow identification is. The process then transmits the packet to the associated destination application.

The third stage 715 of FIG. 7 shows that at time T3 the destination endpoint 781 has received the packet P2 and transmitted this packet towards the application 782, which is the destination application for this packet based on the value stores in the IPv4 identification field of the packet. The third stage 715 also shows that the destination endpoint 781 receives a new packet P3 from the source endpoint 560. As indicated by the data in the TCP header of this packet, the source and destination ports of the packet are SPort1 and DPort1, which are the same source and destination ports as for the packet P3 at the second stage 710. As such, this packet belongs to the same data flow to which the packet P2 belonged. Additionally, the source and destination machines are the same, and thus the two data flows have the same source and destination IP addresses (i.e., SIP A and DIP B). The destination endpoint then realizes that the packet P3 is not the first packet of its data flow (e.g., because the packet is not a SYN packet). After determining that the packet is not a first packet in its data flow, the destination endpoint compares the value of the IPv4 identification field (i.e., 7) with the list of ongoing data flows that is stored in a particular data structure of the endpoint. Because this value matches the same data flow that was determined for packet P2 the endpoint will transmit the packet to the same destination application as it has for the packet P2 (i.e., destination application 782). This stage also shows that at time T3, the source endpoint has transmitted the packet P4 towards the destination endpoint.

The fourth stage 720 illustrates that at time T4 the destination endpoint 781 receives a new packet P4 of yet another different data flow from the source endpoint 560. As indicated by the data in the TCP header of the packet P4, the source and destination ports of this packet (SPort2 and DPort2) are different than the source and destination ports of the packets P1 and P2 in the first and second stages respectively. As such, this packet belongs to a third data flow initiated by application 550 running on the virtual machine 530. The source and destination machines are the same in both data flows, and thus the two data flows have the same source and destination IP addresses (i.e., SIP A and DIP B). The destination endpoint, however, is not required to know about these information either, since it only looks at the IPv4 identification field of the packet. By looking at the identification field, the destination endpoint realizes that not only the stored value is indicative of a flow identification value (because the value is within the specified range), but also it indicates that the packet belongs to a different data flow than the previous data flows (the value is 12). Therefore the destination endpoint will transfer the packet to a proper destination accordingly (destination application 783). This stage also shows that at time T4, the source endpoint has transmitted the packet P5 towards the destination endpoint.

It should be understood that the two examples described above are only two use cases of assigning different flow identification values to different data flows. There are many other benefits of having separate flow identification values for separate data flows when the network elements of a network are configured to process the packets based on their corresponding data flows. In other words, identifying the data flows as described in the above embodiments raises the efficiency of any flow based networking for which different policies are defined on how the underlying switches should forward, drop, and measure the traffic based on the data flows of the packets.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
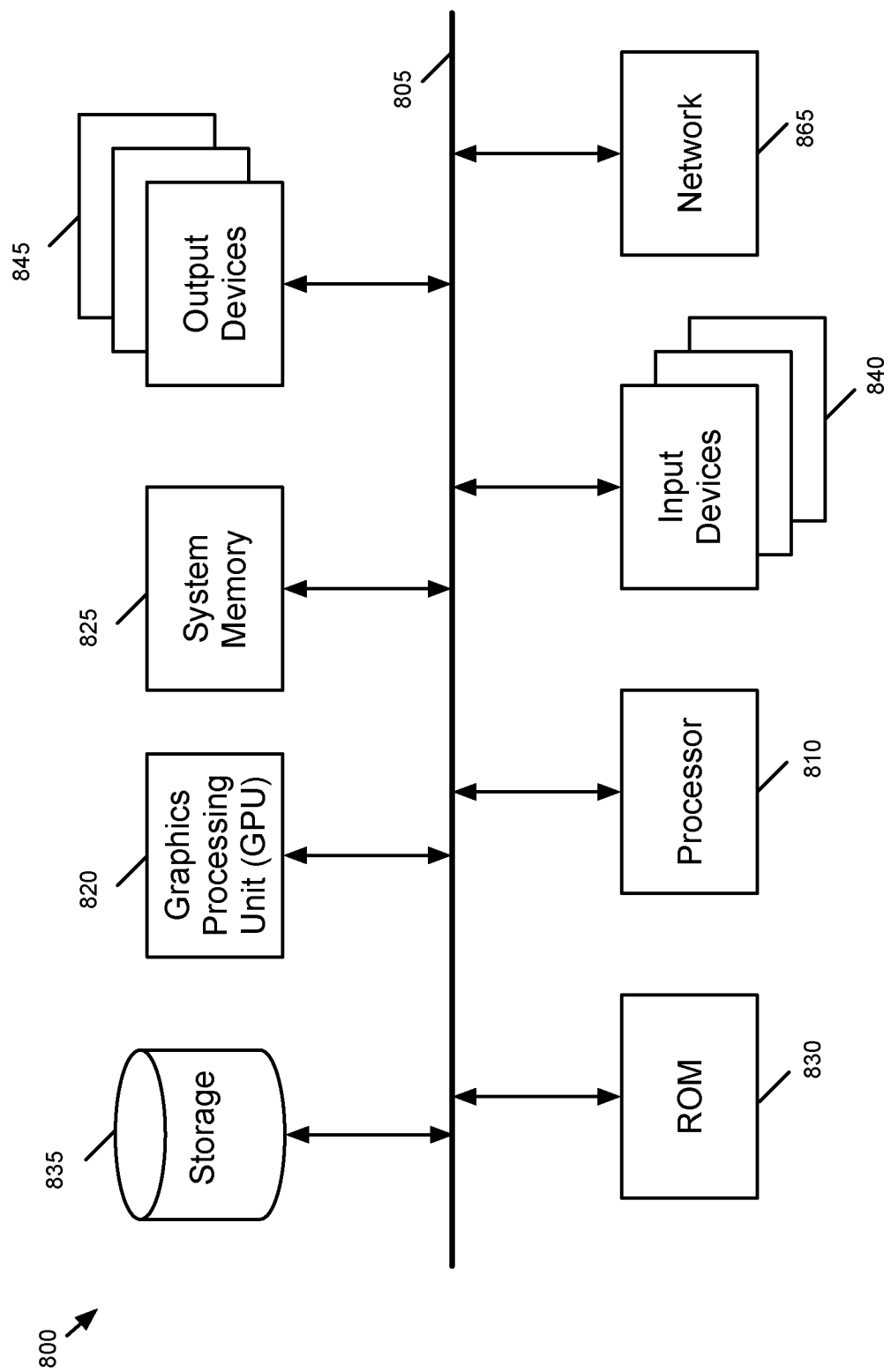
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2, 4, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for identifying data flows in a network, the method comprising:
   receiving a first packet of a data flow;
   determining whether a flag in the first packet is set;
   when the flag is set in the first packet, generating a flow identification value that identifies the data flow and inserting the flow identification value into a particular header location of the first packet, wherein different flow identification values are generated for the packets of different data flows to identify the different data flows;

when the flag is not set in the first packet, generating a packet identification value for the packet and inserting the packet identification value into the particular header location of the first packet; and transmitting the first packet with the inserted identification value to a destination for the data flow, wherein:
when the flow identification value is generated for the first packet, the flow identification value is also inserted into subsequent packets of the data flow; and
when the packet identification value is generated for the first packet, different packet identification values are inserted into subsequent packets of the data flow.

2. The method of claim 1, wherein the particular header location comprises an Internet Protocol version 4 (IPv4) identification field of an IP header of the packet, the method further comprising, for each subsequent packet of the data flow when the flow identification value is generated for the first packet:
determining that the flag in the subsequent packet is set;
inserting the same flow identification value into the IPv4 identification field of the IP header of the subsequent packet; and
transmitting the subsequent packet with the inserted flow identification value to the destination.

3. The method of claim 1, wherein the first packet is received at one of a source endpoint and a gateway of the network.

4. The method of claim 1, wherein the particular header location has a length corresponding to a particular range of values, wherein the generated identification value is restricted to a first sub-range of the particular range of values when a flow identification value is generated and a second, different sub-range of the particular range of values when a packet identification value is generated.

5. The method of claim 1, wherein the flag comprises a Do Not Fragment (DNF) bit in an Internet Protocol (IP) header of the first packet.

6. The method of claim 1, wherein each subsequent packet is identified as a subsequent packet of the data flow when a set of attributes of the subsequent packet matches a set of attributes of the first packet of the data flow.

7. The method of claim 6, wherein each set of attributes comprises a source Internet Protocol (IP) address, a destination IP address, a source transport port number, a destination transport port number, and a transport protocol.

8. The method of claim 7, wherein the set of attributes for each packet is identified by examining an IP header and a transport layer header of the packet.

9. The method of claim 1, wherein the data flow is a first data flow and the identification value is a first identification value, the method further comprising:
receiving a second packet;
determining that (i) the flag in the second packet is set and (ii) the second packet is a first packet of a second data flow;
generating a second flow identification value for the second data flow that is different from the first flow identification value;
inserting the second flow identification value into the particular header location of the second packet; and
transmitting the second packet with the inserted second flow identification value to a destination for the second data flow.

10. The method of claim 9 further comprising, for each subsequent packet of the second data flow:
determining that the flag in the subsequent packet of the second data flow is set;
inserting the second flow identification value into the particular header location of the subsequent packet of the second data flow; and
transmitting the subsequent packet of the second data flow with the inserted second flow identification value to the destination for the second data flow.

11. The method of claim 9, wherein the second packet is determined to belong to the second data flow when a set of attributes of the second packet does not match a set of attributes of the first packet of the first data flow.

12. The method of claim 11, wherein each set of attributes comprises a source Internet Protocol (IP) address, a destination IP address, a source transport port number, a destination transport port number, and a transport protocol.

13. The method of claim 12, wherein the source IP address of the first set of attributes is the same as the source IP address of the second set of attributes.

14. The method of claim 9, wherein an intermediate device of the network manages the network traffic by identifying different flow identification values and transmitting packets to different links of the network based on the identified flow identification values.

15. The method of claim 14, wherein the particular header location comprises a particular field of an Internet Protocol (IP) header of the packet, wherein the intermediate device identifies the different identification values by examining the IP headers of the packets without examining any transport layer headers of the packets.

16. The method of claim 14, wherein, when the first flow identification value is generated for the first packet, a destination endpoint receives the first and second packets, identifies the first and second flow identification fields, and based on the identification, transmits each packet to a different destination application that executes on the destination endpoint.

17. The method of claim 16, wherein the particular header location comprises a particular field of an Internet Protocol (IP) header of the packet, wherein the destination endpoint identifies the different identification values by examining the IP headers of the packets without examining any transport layer headers of the packets.

18. A non-transitory machine readable medium storing a program for identifying data flows in a network, the program comprising sets of instructions for:
receiving a first packet of a data flow;
determining whether a flag in the first packet is set;
when the flag is set in the first packet, generating a flow identification value that identifies the data flow and inserting the flow identification value into a particular header location of the first packet, wherein different flow identification values are generated for the packets of different data flows to identify the different data flows;
when the flag is not set in the first packet, generating a packet identification value for the packet and inserting the packet identification value into the particular header location of the first packet; and
transmitting the first packet with the inserted identification value to a destination for the data flow, wherein:
when the flow identification value is generated, the flow identification value is also inserted into subsequent packets of the data flow; and when the packet identification value is generated, different packet identification values are inserted into subsequent packets of the data flow.

19. The non-transitory machine readable medium of claim 18, wherein the program further comprises sets of instructions for, when the flow identification value is generated for the first packet:

for each subsequent packet of the data flow, determining that the flag in the subsequent packet is set;
inserting the same flow identification value into the particular header location of the subsequent packet; and
transmitting the subsequent packet with the inserted flow identification value to a destination for the data flow.

20. The non-transitory machine readable medium of claim 18, wherein the flag comprises a Do Not Fragment (DNF) bit in an Internet Protocol (IP) header of the first packet, wherein the set of instructions for generating the packet identification value comprises a set of instructions for generating an incremental value as the packet identification value.

21. The non-transitory machine readable medium of claim 20, wherein the program further comprises sets of instructions for, when the packet identification value is generated for the first packet:

for each subsequent packet of the data flow, determining that the DNF bit in the subsequent packet is not set;
incrementing the packet identification value and inserting the incremented packet identification value into the particular header location of the subsequent packet; and
transmitting the subsequent packet with the inserted incremented packet identification value to the destination.

22. The non-transitory machine readable medium of claim 18, wherein the particular header location has a length corresponding to a particular range of values, wherein the generated identification value is restricted to a first sub-range of the particular range of values when a flow identification value is generated and a second, different sub-range of the particular range of values when a packet identification value is generated.

* * * * *